(12) United States Patent
Holt

(10) Patent No.: US 12,493,451 B1
(45) Date of Patent: Dec. 9, 2025

(54) HYPERPLEXER

(71) Applicant: Brian Holt, West Chester, PA (US)

(72) Inventor: Brian Holt, West Chester, PA (US)

(73) Assignee: Holtwork LLC, Incline Village, NV (US)

(*) Notice: Subject to any disclaimer, the term of this patent is extended or adjusted under 35 U.S.C. 154(b) by 101 days.

(21) Appl. No.: 17/542,442

(22) Filed: Dec. 5, 2021

Related U.S. Application Data

(63) Continuation-in-part of application No. 17/396,300, filed on Aug. 6, 2021, now abandoned, which is a continuation of application No. 17/184,581, filed on Feb. 24, 2021, now Pat. No. 11,693,629, which is a continuation of application No. 16/914,193, filed on Jun. 26, 2020, now Pat. No. 10,942,709, which is a continuation-in-part of application No. 16/782,378, filed on Feb. 5, 2020, now Pat. No. 10,853,062.

(60) Provisional application No. 63/130,410, filed on Dec. 23, 2020, provisional application No. 63/003,153, filed on Mar. 31, 2020, provisional application No. 62/879,497, filed on Jul. 28, 2019, provisional application No. 62/870,031, filed on Jul. 2, 2019.

(51) Int. Cl.
*G06F 8/30* (2018.01)
*G06F 8/10* (2018.01)
*G06F 8/41* (2018.01)

(52) U.S. Cl.
CPC .............. *G06F 8/30* (2013.01); *G06F 8/10* (2013.01); *G06F 8/41* (2013.01)

(58) Field of Classification Search
CPC ................ G06F 8/30; G06F 8/34; G06F 8/36
See application file for complete search history.

(56) References Cited

U.S. PATENT DOCUMENTS

| | | | |
|---|---|---|---|
| 6,742,175 B1 | 5/2004 | Brassard | |
| 7,934,193 B2 | 4/2011 | Rojer | |
| 8,448,132 B2 | 5/2013 | Lochmann | |
| 8,756,046 B2 | 6/2014 | Linebarger et al. | |
| 8,898,103 B2 | 11/2014 | Menday | |
| 9,880,817 B2 | 1/2018 | Tanguy | |
| 9,880,922 B1 | 1/2018 | Koh et al. | |
| 10,025,801 B2 | 7/2018 | Kaufman et al. | |
| 10,048,946 B2 | 8/2018 | Krishnan et al. | |
| 10,078,501 B2 | 9/2018 | Narayanan et al. | |
| 10,318,251 B1 | 6/2019 | Darnell et al. | |
| 10,324,690 B2 | 6/2019 | Ouali | |
| 10,853,062 B1 | 12/2020 | Holt | |
| 10,942,709 B2 | 3/2021 | Holt | |
| 11,409,521 B2 | 8/2022 | Holt | |
| 2003/0221162 A1 | 11/2003 | Sridhar | |

(Continued)

OTHER PUBLICATIONS

International Search Report and Written Opinion for International Application No. PCT/US2020/040297, mailed on Aug. 31, 2020.

*Primary Examiner* — Duy Khuong T Nguyen
(74) *Attorney, Agent, or Firm* — Clause Eight; Michael Catania

(57) ABSTRACT

A method to securely execute tenant programs from multiple developers on a single server with greater efficiency and less configuration than conventional methods is disclosed herein. Each tenant program is treated as one part of single larger program. Each developer program on a server is coded in the same programming language and shares some particular functionality.

4 Claims, 11 Drawing Sheets

(56) References Cited

U.S. PATENT DOCUMENTS

| | | |
|---|---|---|
| 2005/0160104 A1 | 7/2005 | Meera |
| 2008/0059950 A1 | 3/2008 | Seitz et al. |
| 2008/0082959 A1 | 4/2008 | Fowler |
| 2008/0148229 A1 | 6/2008 | Gownder et al. |
| 2010/0175044 A1 | 7/2010 | Doddavula |
| 2012/0185821 A1 | 7/2012 | Yaseen et al. |
| 2013/0271476 A1 | 10/2013 | Treiman |
| 2013/0305218 A1* | 11/2013 | Hirsch ................ G06F 8/30 717/106 |
| 2014/0101635 A1 | 4/2014 | Hoffman |
| 2014/0365994 A1 | 12/2014 | Vann |
| 2014/0380270 A1 | 12/2014 | Lovisa |
| 2016/0321064 A1* | 11/2016 | Sankaranarasimhan ................ H04L 67/34 |
| 2017/0139680 A1* | 5/2017 | Proctor ................ G06F 8/20 |
| 2018/0157467 A1 | 6/2018 | Stachura |
| 2020/0042330 A1* | 2/2020 | Lipke ................ G06F 9/44521 |
| 2023/0244519 A1* | 8/2023 | Chen ................ G06F 9/45558 718/1 |

* cited by examiner

HYPERPLEXER

CROSS REFERENCES TO RELATED APPLICATIONS

The present application claims priority to U.S. Provisional Patent Application No. 63/130,410, filed on Dec. 23, 2020, and is also a continuation-in-part application of U.S. patent application Ser. No. 17/396,300, filed on Aug. 6, 2021, which is a continuation application of U.S. patent application Ser. No. 17/184,581, filed on Feb. 24, 2021, which is a continuation application of U.S. patent application Ser. No. 16/914,193, filed on Jun. 26, 2020, now U.S. Pat. No. 10,942,709, issued on Mar. 9, 2021, which is a continuation-in-part of U.S. patent application Ser. No. 16/782,378, filed on Feb. 5, 2020, now U.S. Pat. No. 10,853,062, issued on Dec. 1, 2020, which claims priority to U.S. Provisional Patent Application No. 62/870,031, filed on Jul. 2, 2019, and claims priority to U.S. Provisional Patent Application No. 62/879,497, filed on Jul. 28, 2019, and U.S. patent application Ser. No. 16/914,193 also claims priority to U.S. Provisional Patent Application No. 63/003,153, filed on Mar. 31, 2020, each of the foregoing is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to cloud computing, web hosting, and Software as a Service (SaaS). The present invention additionally relates to the distribution and interfacing of generated computer programs.

Description of the Related Art

Cloud computing is a relatively new market in which cloud providers purchase, preconfigure, and maintain computer servers which they then rent on-demand to software developers. For developers, renting existing servers from a cloud provider is less burdensome and more flexible than purchasing and maintaining servers. To maximize the use of computer resources, cloud providers typically execute programs from multiple developers on one server. However, this multitenant method poses a security challenge as different programs on one server might access each other's sensitive data or interfere with each other's access to computing resources.

Conventionally, there have been two solutions to the multitenant security problem. The first conventional solution has been multi-user operating systems, such as Unix and Linux. In this solution, the operating system's supervisor requires each program to be executed by a user. Each user is given limited access to configuration and shared computing resources. The second conventional solution has been virtualization or containers. In this solution, the primary operating system runs a hypervisor that allocates the computing resources to isolated secondary operating systems which generally operate as described above, except the developer is given full administrator privileges ("root" in Unix-like systems) over the secondary operating system.

Both solutions divert computing resources to isolate each developer's program, and thus reduce computing efficiency. Both solutions also generally require reconfiguration for each new tenant on a server, which may require downtime and/or further divert resources from the essential computing. Both solutions are limited in their specialization/optimization as one server is required to execute dissimilar tenant programs.

SUMMARY OF THE INVENTION

The present invention is a novel method to securely execute tenant programs from multiple developers on a single server with greater efficiency and less configuration than conventional methods. The present invention treats each tenant program as one part of single larger program. Each developer program on a server is coded in the same programming language and shares some particular functionality—e.g. each program is a PHP script that receives a HyperText Transfer Protocol (HTTP) request and outputs an HTTP response.

In one embodiment, the present invention more efficiently executes manually written tenant programs on a multitenant server. In one embodiment, the present invention more efficiently executes tenant programs generated (in part or whole) by code generators on a multitenant server. In one embodiment, the present invention more efficiently executes tenant programs generated from a schema or specification on a multitenant server. In one embodiment, the present invention more efficiently replicates a tenant program across a cloud computing network.

The term "Hyperplexer" is derived from the term "multiplexer," an electronic device that selects one signal from multiple concurrent signals on a line. Analogously, one aspect of the Hyperplexer is to select one program for execution from multiple cotenant programs on a computer.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE DRAWINGS

Those skilled in the art will recognize the included drawings provide only a few illustrative examples of possible embodiments of the present invention. These embodiments are optionally combined to form complex embodiments of the present invention to gain multiple efficiencies.

Figure 1:
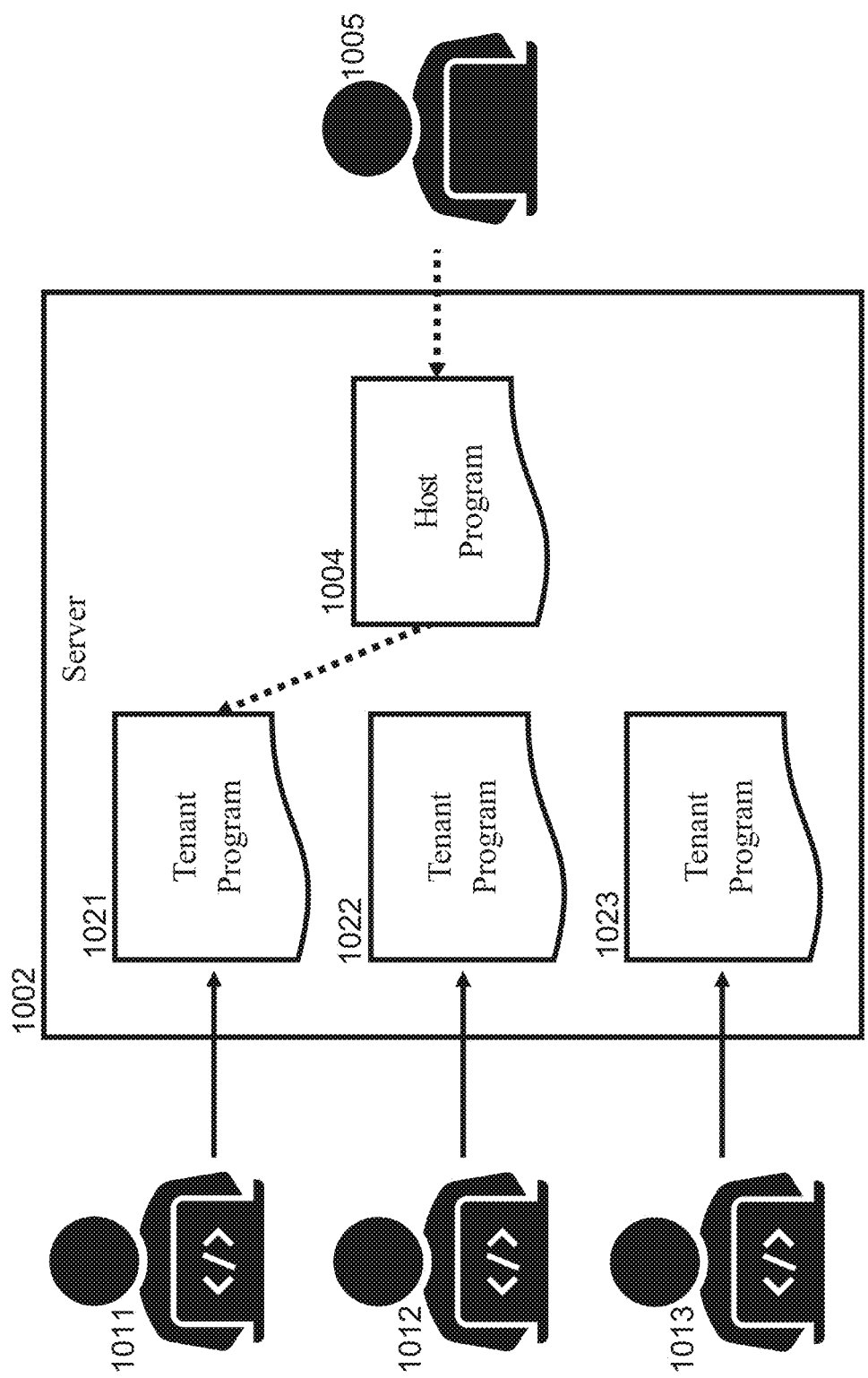
FIG. 1 illustrates an exemplary embodiment of a user sending a request to a server, which executes a host program, which executes a tenant program.

FIG. 1 illustrates an exemplary embodiment. A developer 1011 installs a tenant program 1021 on a server 1002. A user 1005 makes a network request to the server, which executes a host program 1004. The host program 1004 selects the tenant program 1021 according to input from the user 1005 and executes the tenant program 1021.

Figure 2:
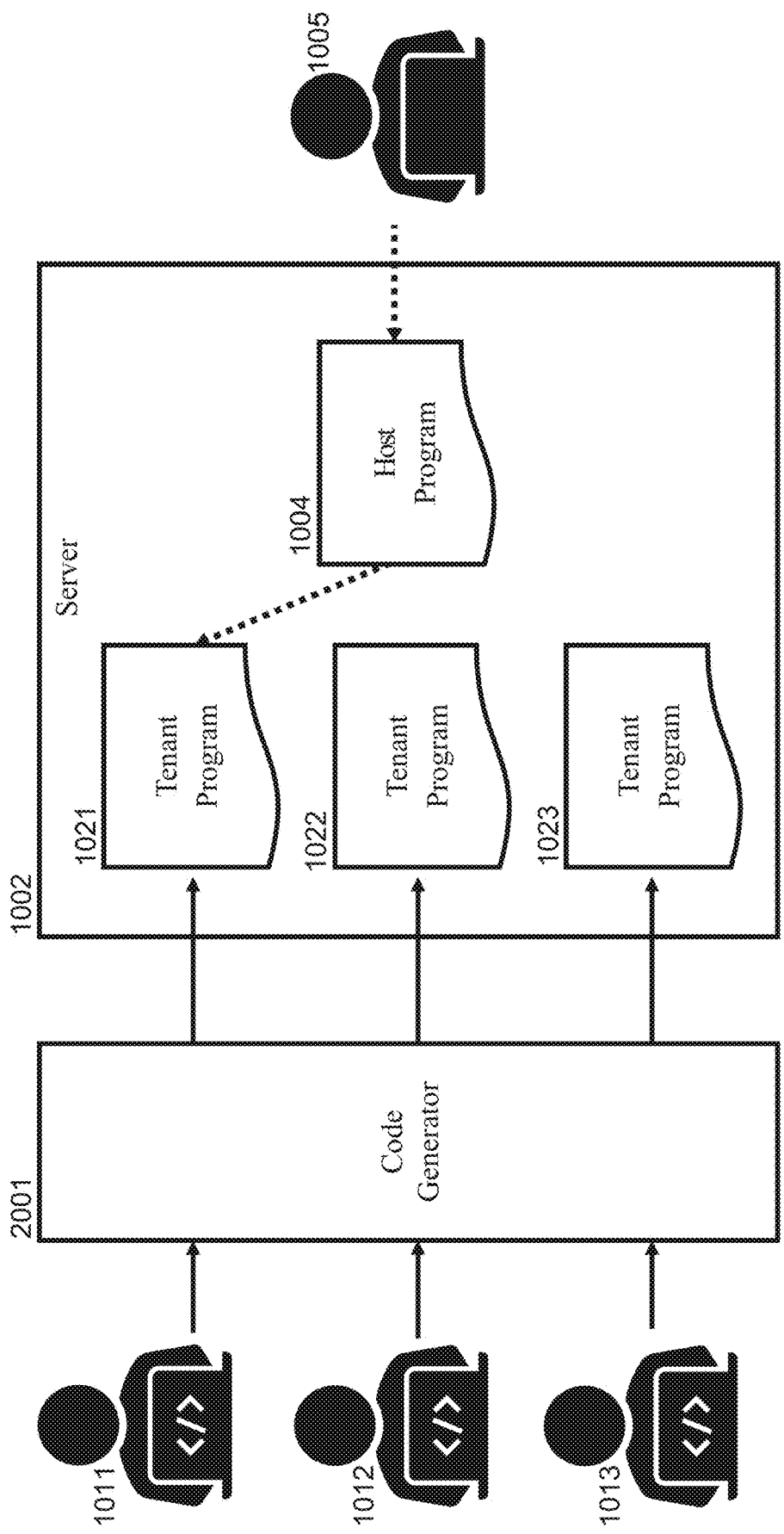
FIG. 2 illustrates one embodiment that includes a code generator.

FIG. 2 illustrates one embodiment that includes a code generator. A developer 1011 creates a tenant program using a code generator 2001. The code generator 2001 installs the tenant program 1021 on a server 1002. A user 1005 makes a network request to the server, which executes a host program 1004. The host program 1004 selects the tenant program 1021 according to input from the user 1005 and executes the tenant program 1021.

Figure 3:
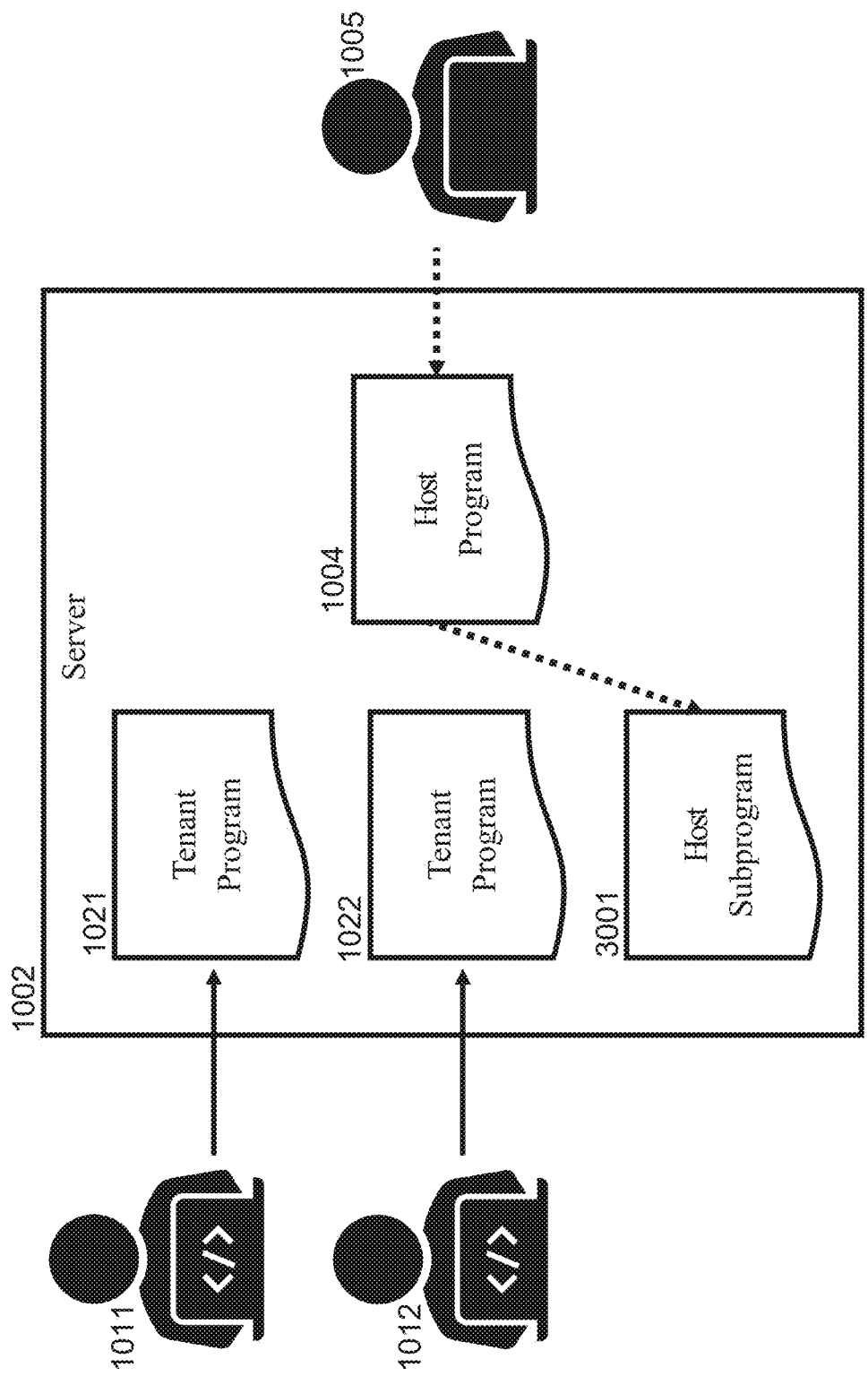
FIG. 3 illustrates one embodiment wherein the host program redirects a user's request to a host subprogram.

FIG. 3 illustrates one embodiment wherein the host program 1004 redirects a user's 1005 request to a tenant program 1021 towards a host subprogram 3001 not created by the developer 1011. The host subprogram 3001 optionally provides a common utility function such as login/logout for use in combination with the tenant program 1021. The host program 1004 optionally additionally executes the appropriate tenant program 1021 after executing the host subprogram 1004.

Figure 4:
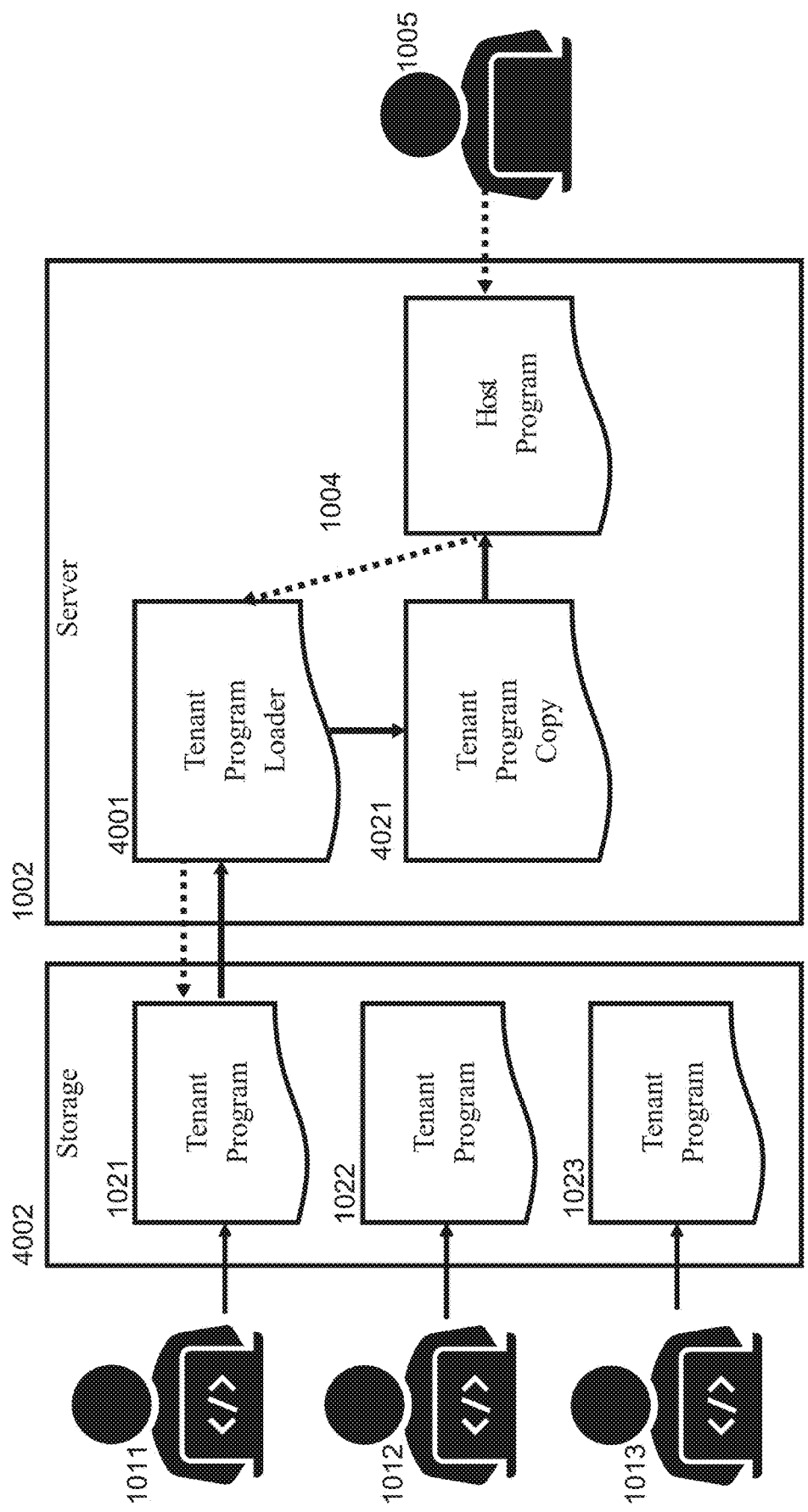
FIG. 4 illustrates one embodiment wherein a tenant program is stored on a separate computer.

FIG. 4 illustrates one embodiment wherein a tenant program is stored on a separate computer. A developer 1011 uploads a tenant program 1021 to a storage device 4002. A user 1005 sends a request to a server 1002. The server 1002 executes the host program 1004. The host program 1004 executes a tenant program loader 4001, which sends a network request to the storage computer 4002 to access the specific tenant program 1021. The server 1002 downloads a copy of the tenant program locally 4021. The server executes the tenant program copy 4021 through the host program 1004 and responds to the user 1005 with the tenant program's 4021 output.

Figure 5:
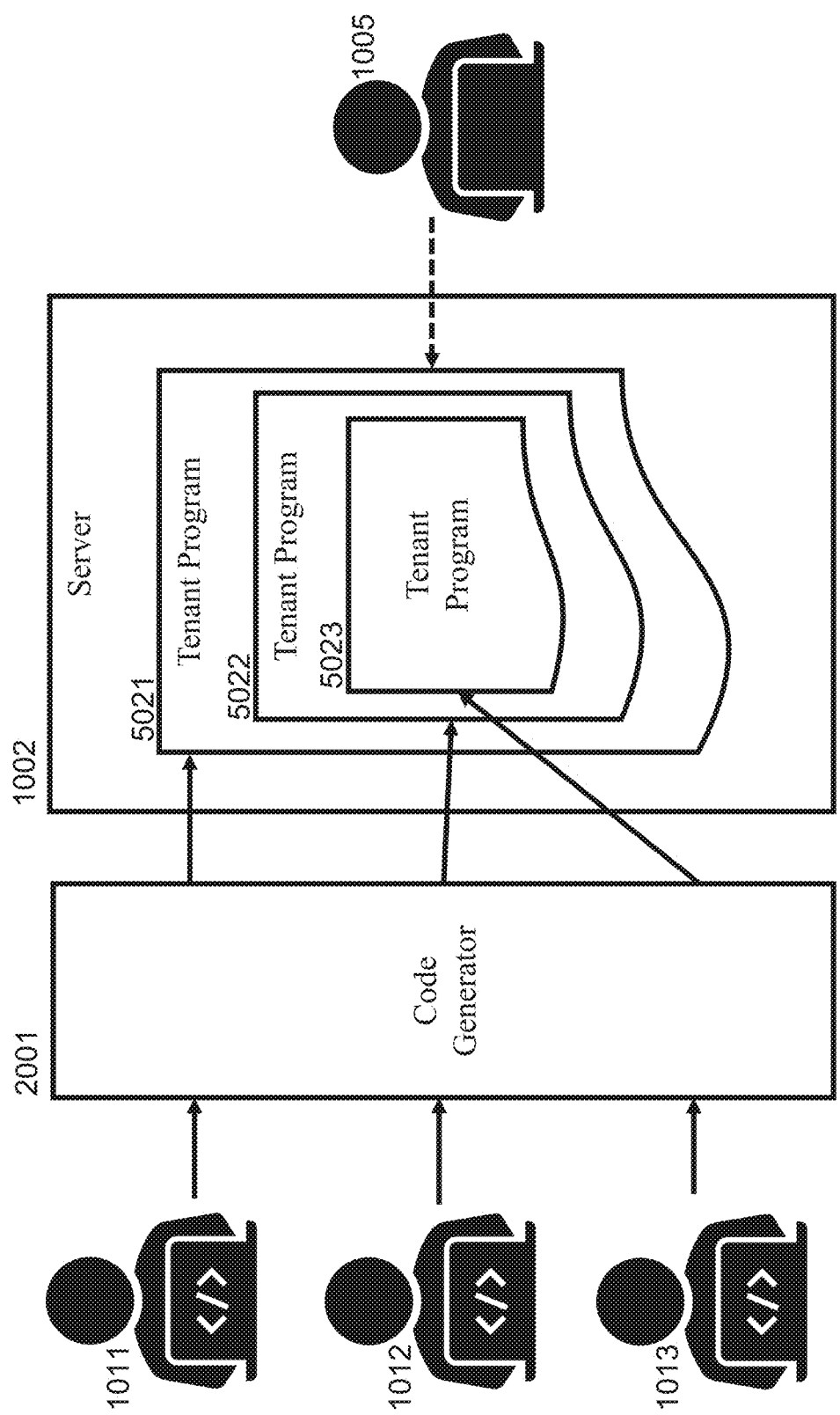
FIG. 5 illustrates one embodiment wherein a tenant program is generated by a code generator containing another tenant program.

FIG. 5 illustrates one embodiment wherein a tenant program is generated by a code generator containing another tenant program. A developer 1011 uses a code generator program 2001 to create a first tenant program 5021. The first tenant program 5021 contains code from a second tenant program 5022 previously created by a second developer 1012. The second tenant program 5022 contains code from a third tenant program 5023 previously created by a third developer 1013. A user 1005 sends a request to a server 1002. The server executes the first tenant program 5021 and responds to the user with the output.

Figure 6:
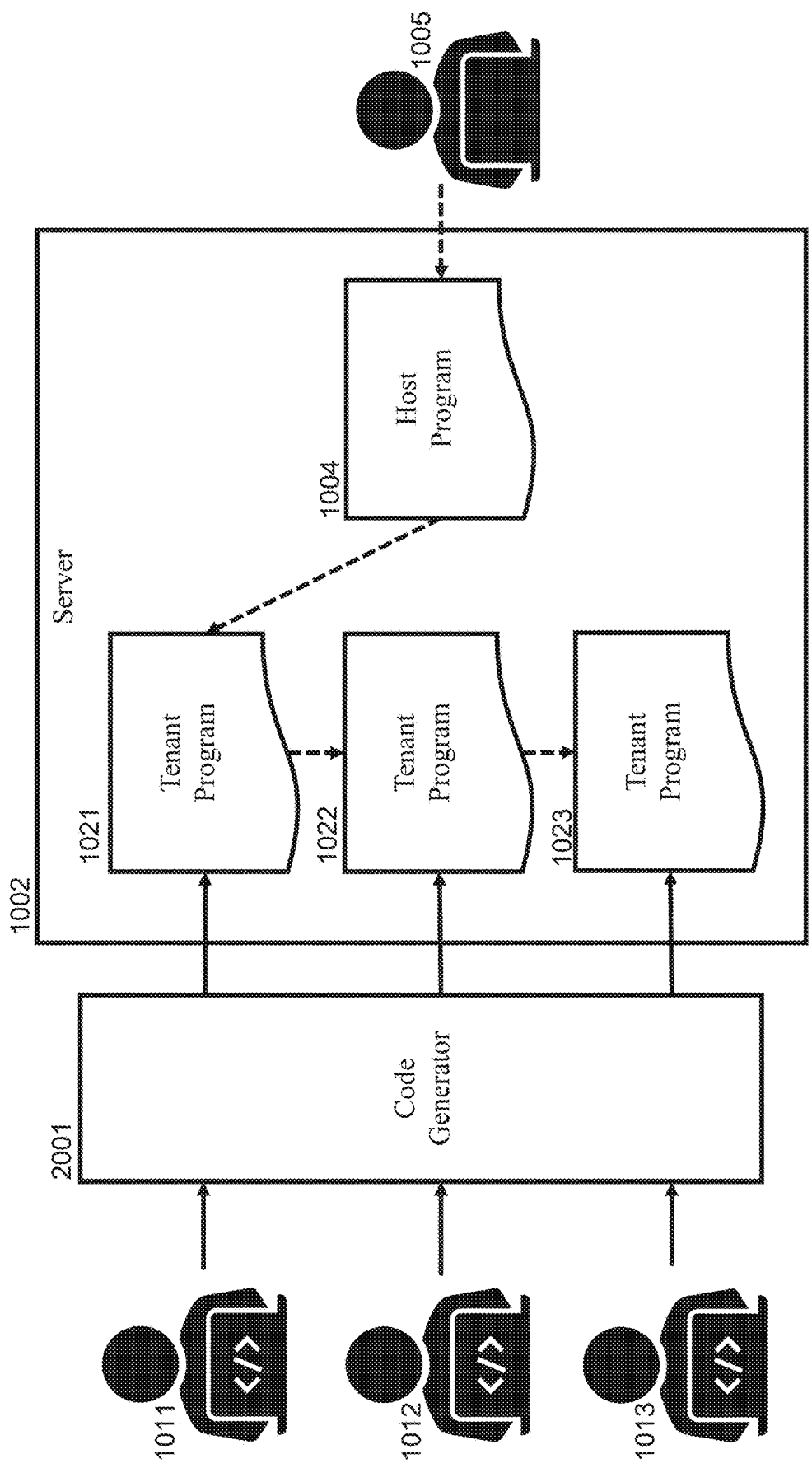
FIG. 6 illustrates one embodiment wherein a first tenant program comprising a reference to a second tenant program is generated by a code generator.

FIG. 6 illustrates one embodiment wherein a first tenant program comprising a reference to a second tenant program is generated by a code generator. A developer 1011 uses a code generator program 2001 to create a first tenant program 1021. The first tenant program 1021 references a second tenant program 1022 previously created by a second developer 1012. The second tenant program 1022 references a third tenant program 1023 previously created by a third developer 1013. Optionally these references are language-specific require statements, for example require 'secondTenantProgram.php'; in PHP. Alternatively, these references are functions to make API calls. A user 1005 sends a request to a server 1002. The server executes the first tenant program 1021 which triggers the execution of the second tenant program 1022 which triggers the execution of a third tenant program 1023. The sever 1002 responds to the user with the tenant program 1021 output.

Figure 7:
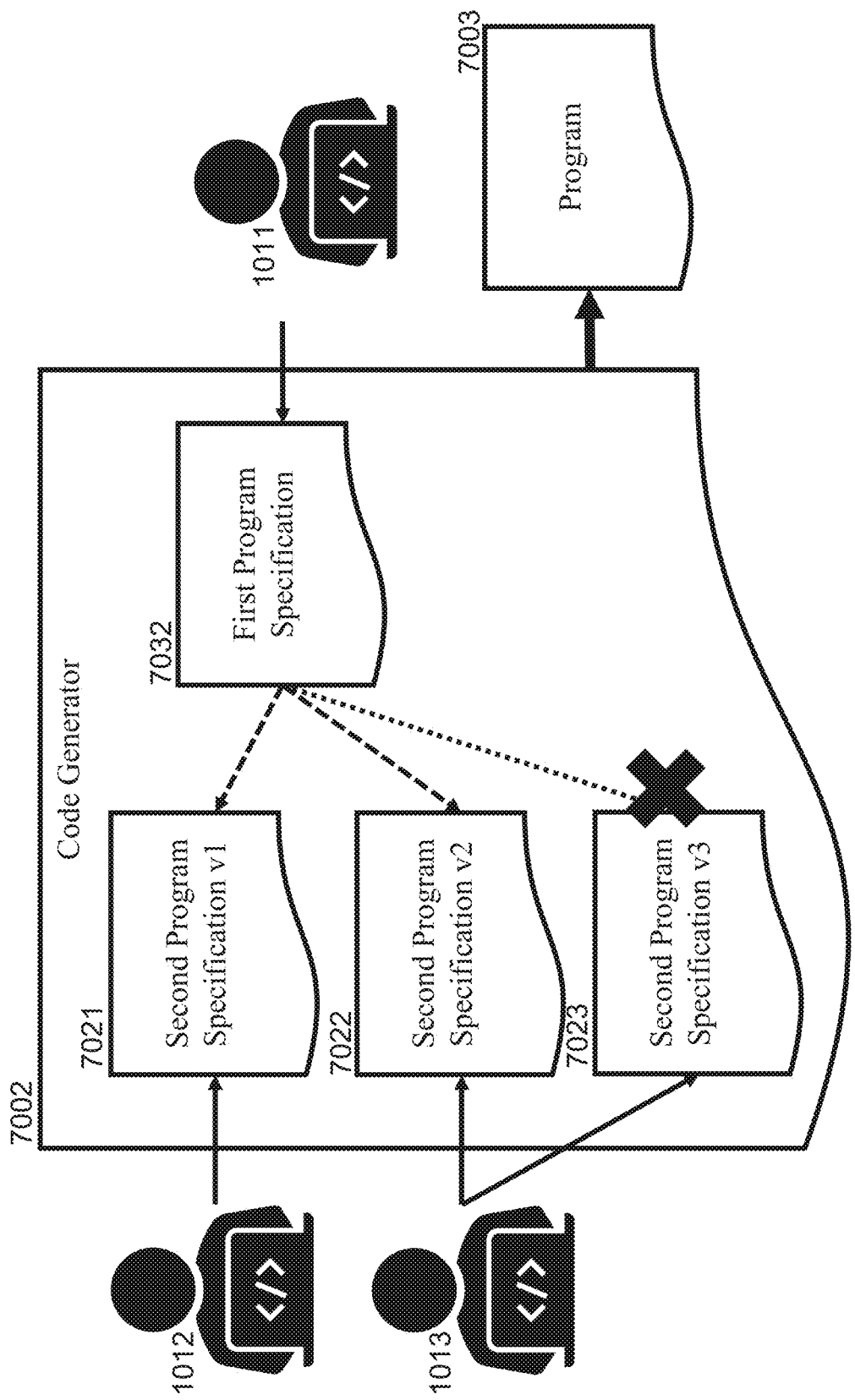
FIG. 7 illustrates a code generator combining distinct specifications into one program.

FIG. 7 illustrates a code generator combining distinct specifications. A first developer 1011 inputs a first program specification 7032 into a code generator program 7002. The code generator 7002 detects the first program specification 7032 references a second specification type. The code generator 7002 accesses three specification versions matching the second specification type (7021, 7022, 7023). The code generator 7002 evaluates each specification version (7021, 7022, 7023) for compatibility with the first specification. The code generator 7002 determines the first version of the second specification 7021 is compatible. The code generator 7002 determines the second version of the second specification 7022 is compatible. The code generator 7002 determines the third version of the second specification 7023 is not compatible. The code generator selects, based on desired optimizations, either the first version of the second specification 7021 or the second version of the second specification 7022 to combine with the first specification 7032; for example, the code generator presumes a smaller specification will execute faster, determines the first version of the second specification is smaller 7021, and therefore selects that version for combination. The code generator 7002 generates a program 7003 using the combined specifications. Optionally, the code generator generates code for the second program within the code of the first program. Alternatively, the code generator creates a reference to the second program with the code of the first program; for example, the code generator inserts the PHP line require 'secondprogram-v2.php'; into the first program at the appropriate location. The program 7003 is optionally outputted to the developer or installed on a server.

Figure 8:
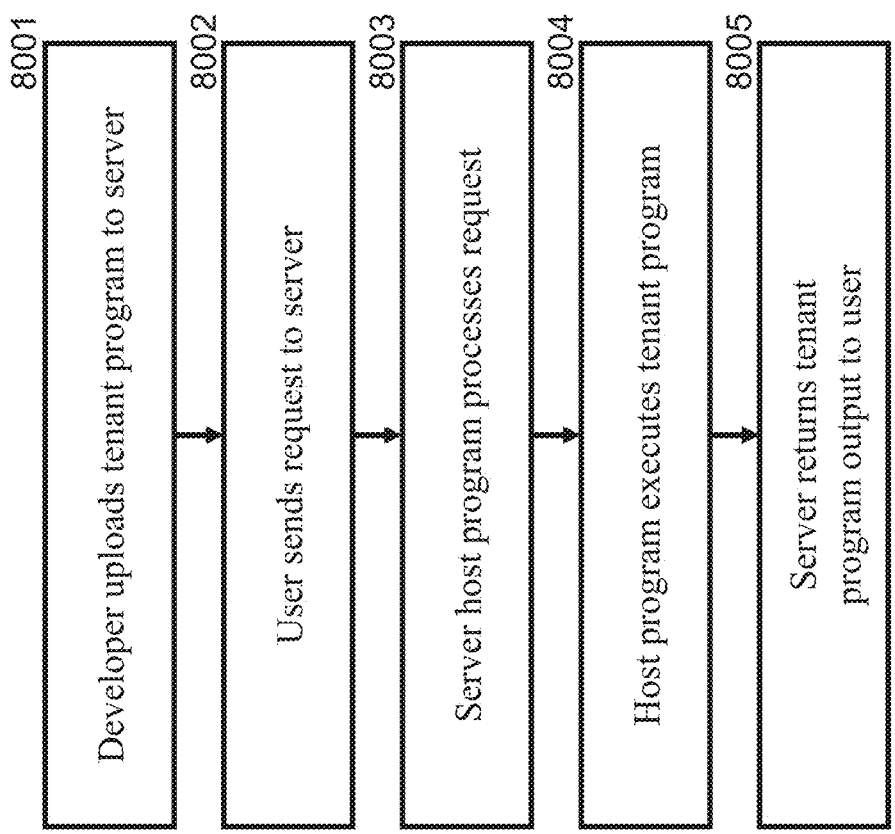
FIG. 8 shows a flow diagram for one embodiment.

FIG. 8 shows a flow diagram for one embodiment. At block 8001, a developer uploads a tenant program to a server. At block 8002, a user sends a request to the server. At block 8003, a host program on the server processes the request. At block 8004, the host program selects and executes the tenant program according to data sent in the user's request. At block 8005, the server returns the tenant program output to the user.

Figure 9:
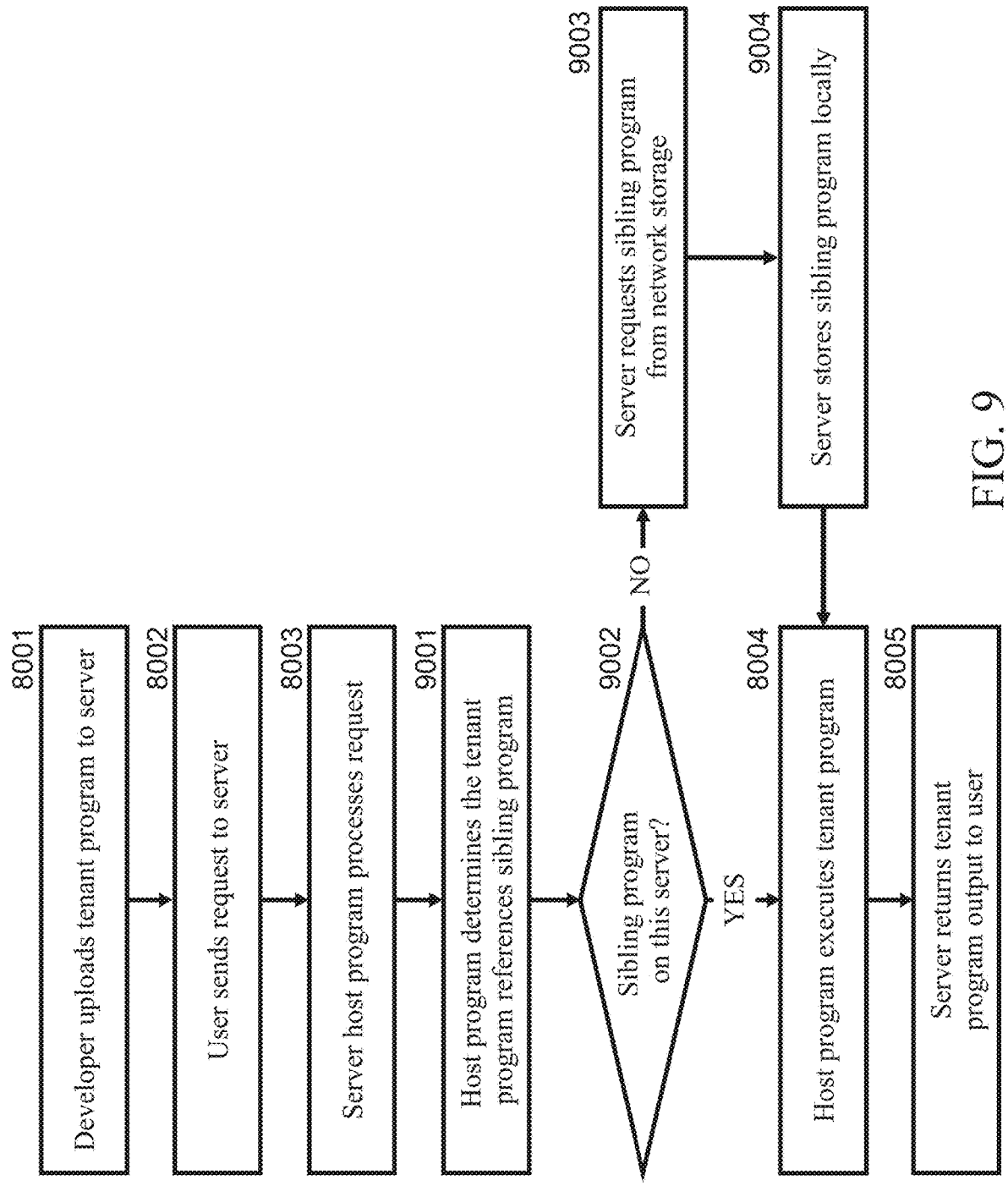
FIG. 9 shows a flow diagram for one embodiment wherein a tenant program references a second "sibling" tenant program for execution.

FIG. 9 shows a flow diagram for one embodiment wherein a tenant program requires a second tenant program, termed a sibling program, not stored on the present server. At block 8001, the developer uploads a tenant program to a server. At block 8002, a user sends a request to the server. At block 8003, a host program on the server processes the request. At block 9001, the host program determines that the tenant program references a sibling program; for example, the tenant program is associated with meta data containing a sibling program identifier; or, for example, the host program reads the tenant program code for certain strings such as require 'secondTenantProgram.php';. At block 9002, the host program determines if the sibling program is accessible locally on the server; for example, the host program checks if a certain file name such as/tenants/secondTenantProgram.php exists in the local file system. If YES, the host program continues to block 8004. If NO, the host program sends one or more network request to other computers which may store a copy of the sibling program at block 9003; for example, the host program may send an API request to servers in its network; or, for example, host program may check if the sibling program is accessible on an NFS device. Optionally, the sibling program is identified by a hash of its contents. Upon finding the sibling program on another device, the host program downloads a copy to the present server at block 9004; for example, the program is downloaded using NFS, SSH, SFTP, FTP, Rsync, IPFS, WebDAV, HTTP, or HTTPS. At block 8004, the host program selects and executes the tenant program according to data sent in the user's request. At block 8005, the server returns the tenant program output to the user. Optionally, the sibling program is a specification for the sibling program to be generated into a program on demand. This embodiment is advantageous in that a server can access a greater number of programs than it could efficiently store locally. This allows a large network of servers using the present invention to access a large pool of tenant programs and dynamically load/unload programs to meet demand. This allows for more efficient "serverless" cloud computing.

Figure 10:
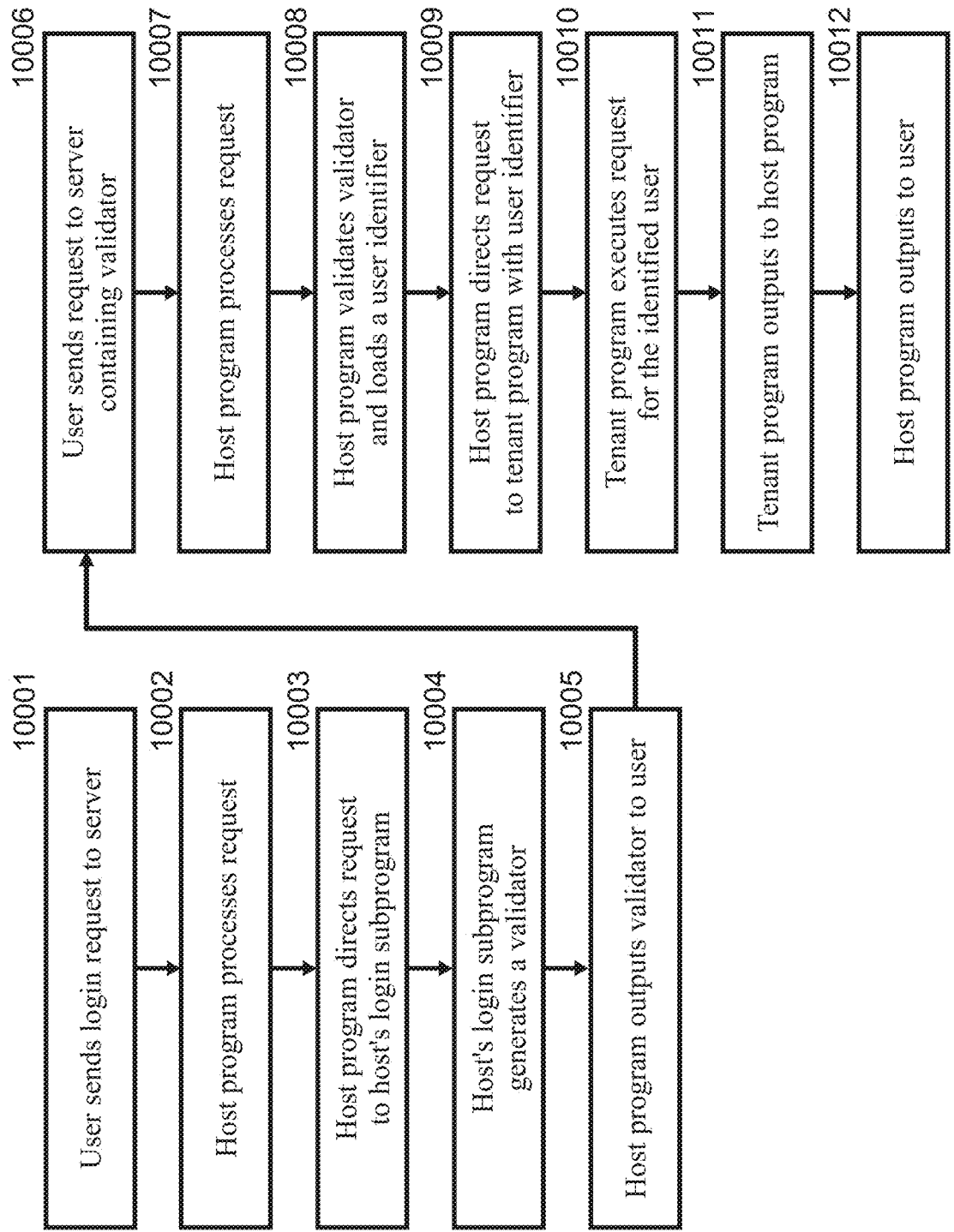
FIG. 10 shows a flow diagram for one embodiment wherein a host program authorizes a login for a tenant program.

FIG. 10 shows a flow diagram for one embodiment wherein a host program authorizes a login for a tenant program. At block 10001, a user sends a login request to the server; for example, the user sends an HTTP request to https://tenantdomain.com/login containing a username and password. At block 10002, the server receives the request and executes the host program to process the request. At block 10003, the host program determines that this is a login request and executes the host's login subprogram; for example, the host program redirects HTTP requests to/login to the login subprogram, while HTTP requests to other paths are typically directed to a tenant program associated with the HTTP Host header. At block 10004, the login subprogram validates the user's credentials and generates a session token; for example, the login subprogram compares a received username and passwords against a user database and then creates a new entry in a session database associating a long session token string with the user's row in the user database. At block 10005, the host program outputs a validator to the user; for example, the host program returns an HTTP response containing a session token comprising a long pseudorandom alphanumeric string, which the user's browser then stores as an HTTP cookie. At block 10006, the user sends a second request to the server containing the session token; for example, an HTTP request to https://tenantdomain.com/myblogs. At block 10007, the host program processes the second request. At block 10008, the host program recognizes the request contains a session token, validates the token, and then loads the associated user's information; for example, the user's request contains a HTTP Cookie header with the key-value sessionId=123, the host program retrieves the row associated with that sessionId in the session database table, the host program then uses the userId column value in the session row to retrieve an associated row from the user table, the host program then stores data from the user's row as program variables accessible by the tenant program. At block 10009, the host program executes the appropriate tenant program according to data in the request; for example, the host program associates the HTTP request header Host: tenantdomain.com with a certain tenant program. At block 10010, the tenant program is executed utilizing the user's information as validated and retrieved by the host program; for example, the tenant program is a blogging program and a request to/myblogs causes the tenant program to return a list of rows in a blog database table associated with the userId value passed as a variable from the host program. At block 10011, the tenant program outputs to the host program. At block 10012, the host program outputs to the user. Optionally, the tenant program was formed by a code generator and designed to interface with the host login subprogram.

Figure 11:
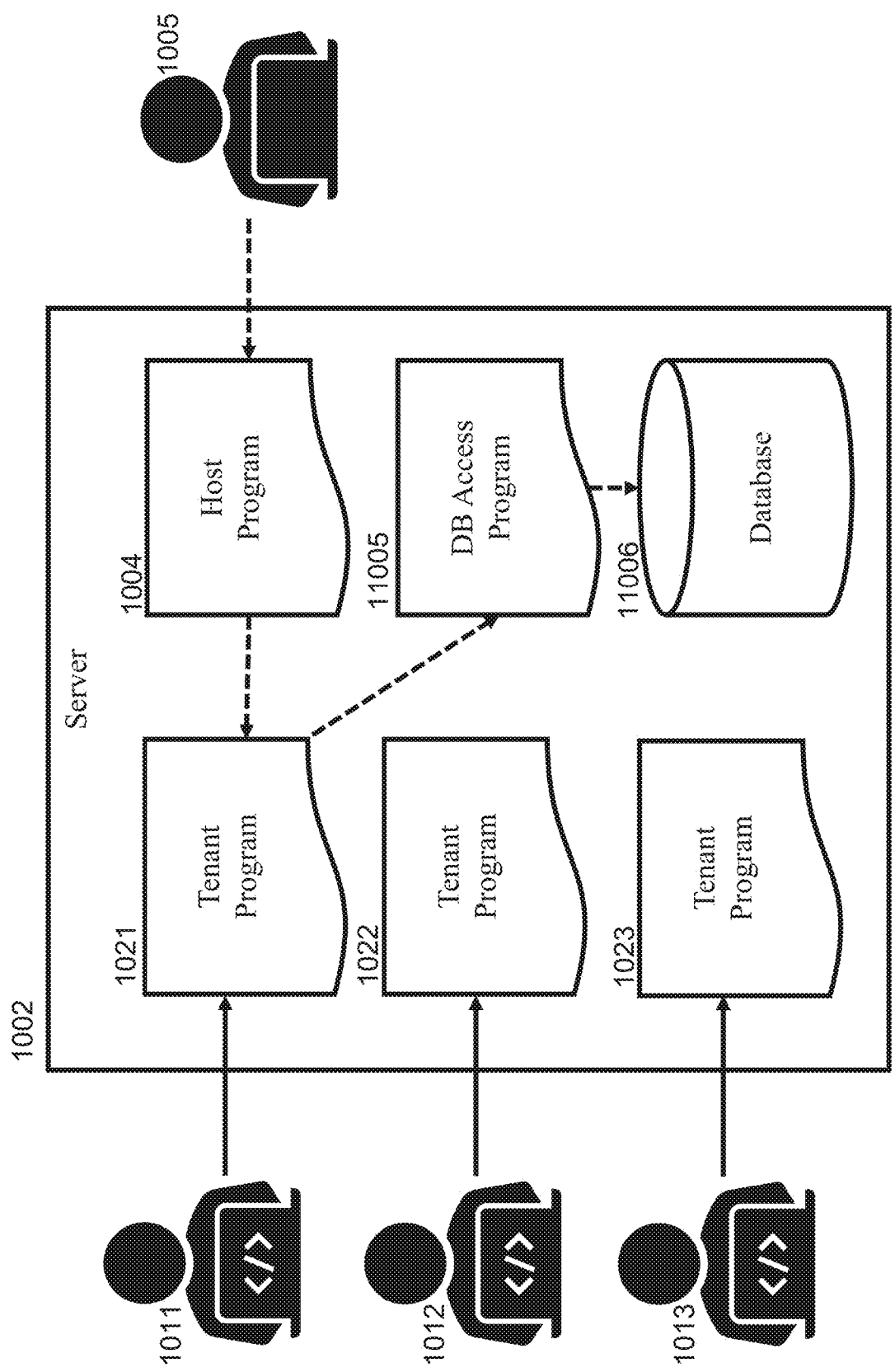
FIG. 11 illustrates a secure database access method for a multitenant server.

FIG. 11 shows a multitenant server 1002 with database access. The user 1005 makes a request to the host program 1004. The host program 1004 selects a tenant 1021 program to execute. The tenant program executes a database access program 11005. The database access program automatically restricts the tenant program to access only authorized data from the database 11006. Typically, the database access program will be written by the provider. Optionally, the host program comprises the database access program. The database access program grants access to different sets of data in the database to different tenant programs. Optionally, multiple tenant programs may share access to certain sets of data in the database. For example, two different tenant programs may be granted access to a user's profile which may include their name and email address, thus allowing the user to maintain only one profile that works with many programs. Optionally, the database is a relational database such as MySQL, Oracle, or Postgres. Optionally the database is a non-relational database such as MongoDB or Redis. Optionally, the database access program automatically injects query fields to limit access, such adding tenantProgramId=1234 to the WHERE clause in an SQL query. Optionally, the database access program uses cryptographic functions to limit access. Optionally, the database is stored on the same server as the tenant program; alternatively, the database is stored on a separate server and accessed via network. The database 11006 returns the selected data to the database access program 11005 which returns the data to the tenant program 1021 which manipulates the data according to the user's 1005 request.

Definitions

Application Programming Interface (API) is a connection between computer programs wherein one program offers a known a service to another program. API programs may be located on the same computer, or may be located on distinct computers connected by a network. An example network API design is REST.

Cascading Style Sheets (CSS) is a style sheet language used for describing the presentation of a document written in a markup language such as HTML.

Tenant program is a program on a multitenant computer to be executed by a host program.

Client is a computer initiating a request to a server computer over a network.

Credentials are data inputted by a user to prove their identity, most commonly a username and password.

Code generator is a computer program that receives a specification and outputs a computer program. The output program may be encoded in a programming language, assembly language, machine code, object code, byte code, or other binary code.

Computer, a.k.a. computing device or computing system, is a physical device comprising at least one computer-readable storage medium and at least one processor. A computer operates by reading input data from a computer-readable storage medium, reading instructions from a computer readable storage medium, and executing the input data and instructions with the processor to produce output data. Output data is typically stored in a computer-readable storage medium and/or outputted to a user. Computer form factors include desktops, laptops, smart phones, smart watches, and servers.

Computer-readable storage medium (CRSM), a.k.a. computer data storage medium or simply storage, is a physical device containing input data and/or instructions for use by a computer. Common CRSMs include hard drives (HDD), solid state drives (SSD), flash drives, tape drives, magnetic tape, Compact Discs (CD), Digital Video Discs (DVD), Blue-rays, optical drives, floppy disks, zip drives, random access memory (RAM), read only memory (ROM), and punch cards.

Cloud computing is a method of granting on-demand control of a computer to a developer over a network.

Cloud provider, a.k.a. provider, is a party offering cloud computing. Example cloud providers include Amazon Web Services, Google Cloud, Cloudflare, and Microsoft Azure.

Cloud storage is a special case of cloud computing focused on offering on-demand storage and network transmission of data.

Content Delivery Network (CDN) is a geographically distributed network of servers and data centers designed to quickly server static files and/or execute programs. Example CDN providers include Akamai, Amazon Web Services, Cloudflare, and Microsoft Azure.

Create/Read/Update/Delete (CRUD), a.k.a. manipulate, are the four basic operations on stored data. In SQL, these terms map to INSERT, SELECT, UPDATE, and DELETE. In HTTP, these terms map to POST, GET, PUT, DELETE.

Database (DB), a.k.a. computer database, is an organized set of data stored on a computer-readable storage medium for manipulation by a database program.

Database Management System (DBMS), a.k.a. database program or database software, is a special case program to manipulate a database. Example database management systems include MySQL, Microsoft Access, SQLite, PostgreSQL, MariaDB, Couchbase, Redis, MongoDB, and HBase.

Domain name is an identification string that defines a realm of administrative authority within the Internet. Domain names are used in various networking contexts and for application-specific naming and addressing purposes. Generally, a domain name points to a server at a given IP address.

Domain Name System (DNS) is a hierarchical and decentralized naming system for computers, services, or other resources connected to the Internet or a private network.

Download is the transmission of data from a server computer to a client computer over a network.

Ethernet is a family of wired computer networking technologies commonly used in local area networks (LAN), metropolitan area networks (MAN) and wide area networks (WAN).

Generic top-level domains (gTLDs) are prominent domains such as com, info, net, edu, and org in the Domain Name System.

Hardware, a.k.a. computer hardware, is the collection of physical devices comprising a computer.

Hash function, a.k.a. hash, is a function that converts input data of arbitrary size to an output value of fixed size. Hashes are often used in checksums, check digits, fingerprints, lossy compression, randomization functions, error-correcting codes, and ciphers. Hashes may be implemented by software, hardware, or both. Example hash functions include Secure Hash Algorithm 2 (SHA2), Message-Digest Algorithm 5 (MD5), and cyclic redundancy check 32 (CRC32).

Host program is a software program on a computer designed to dynamically select and execute tenant programs according to user input.

HyperText Markup Language (HTML), is the standard markup language for displaying documents in a web browser.

Input device is a physical device which initiates a computer execution. Such execution includes storing data, storing instructions, and/or selecting instructions and data to execute in the future. Input devices include computer keyboards, keypads, computer mice, touch screens, microphones, cameras, card readers, scanners, bar code readers, chip readers, magnetic tape readers, network modem (wired or wireless), and Bluetooth receiver.

Internet is the global system of interconnected computer networks that uses the TCP/IP protocol to communicate.

Internet Protocol Address (IP address). A unique number identifying a computer connected to the Internet. Internet Protocol version 4 (IPv4) addresses comprise 32 bits. Internet Protocol version 6 (IPv6) addresses comprise 128 bits.

JavaScript Object Notation (JSON) is an open standard file format and data interchange format commonly used in Web APIs.

Linux is a family of open-source Unix-like operating systems based on the Linux kernel first released on Sep. 17, 1991, by Linus Torvalds.

Markup language is a syntax for annotating a document in a way that is visually distinguishable from the content. Markup languages typically do not contain executable instructions. Example markup languages include HTML, LaTex, and Markdown.

Microprocessor is a special case processor that converts a digital electric input signal into a digital electric output signal through a clock-driven interfaced circuit comprising logic gates. Example commercial microprocessors include the Intel 4004, the Intel Pentium line, the IBM PowerPC line, the and the Motorola 68000.

Multitenant describes a computer containing software programs from independent tenants. A multitenant computer may have companies as tenants. A multitenant computer may also have semi-independent divisions, groups, or individuals from a single company as tenants.

Network is two or more computers comminuting. Network data may be sent as electric pulses over copper wire, light pulses over optical fiber, and/or radio waves over the air.

Network protocol is a predefined signal syntax allowing two computers to communicate over a network. Protocols may be implemented by software, hardware, or both. Protocols are typically "layered," wherein more specific protocols are transmitted within more generic protocols. Example protocols include Address Resolution Protocol (ARP), Inter-network Packet Exchange (IPX), Transmission Control Protocol (TCP), Internet Protocol (IP), User Datagram Protocol (UDP), HyperText Transfer Protocol (HTTP), Secure Socket Layer (SSL), Transport Layer Security (TLS), File Transport Protocol (FTP), Secure File Transport Protocol (SFTP), Secure Shell (SSH), Telnet, Domain Name System (DNS). Internet Control Message Protocol (ICMP), NetBIOS, Remote Procedure Call (RPC), Internet Relay Chat (IRC), Network Time Protocol (NTP), Internet Message Access Protocol (IMAP), Post Office Protocol (POP), and Simple Mail Transfer Protocol (SMTP).

Network router, a.k.a. router, is a networking device that forwards data packets between computer networks. A router may itself be a computer.

Network switch, a.k.a. switch or switching hub or bridging hub, is a networking device that connects other devices on a computer network by using packet switching to receive and forward data to the destination device.

HTTP cookie, a.k.a. cookie, is a piece of data stored on a client computer used for storing state information when communicating with a server. Typically, cookies are handled by web browsers.

Open source describes a software program that is made freely available for possible modification and redistribution.

Processor is a physical device that deterministically executes input signals into output signals. Signals are typically electric. Signals may be digital or analog.

Program, a.k.a. computer program or computer application or application or piece of software or app, is a distinct document of software. A program may reference and execute other programs. Example programs include Microsoft Word, WordPress, Apple IOS, and SQLite.

Program specification, a.k.a. specification, is a data document describing the desired function of a computer program. A specification is typically processed by a code generator to output a computer program. Example specification encoding syntaxes include UML, XML, and JSON.

Programming Language is a formal language comprising a set of strings that instruct a computer processor. There are a number of programming languages, each having a specific syntax to encode instructions. Programming languages are typically compiled to machine code for execution at the processor. Example programming languages include: ASP, BASIC, C, C#, C++, COBOL, Erlang, Go, Haskell, Java, JavaScript, Lisp, Objective-C, Perl, Python, PHP, Ruby, Rust, and Scala.

Relational Database Management System (RDBMS) is a special case database management system using tuple principles.

Representational state transfer (REST) is an API design in which a client sends an HTTP request to a server which responds with structured data in XML, JSON, similar format.

Server, a.k.a. web server or network server, is typically a special case computer optimized for receiving requests and sending responses over a computer network. Alternatively, any computer connected to a network, even temporarily, may constitute a server. Desktops, laptops, smart phones, printers, and other computers optionally qualify as servers. The term "server" in this disclosure should not be considered to limit the present invention's applicability to expensive computers on racks in datacenters.

Serverless is a description of a cloud computing system in which the provider dynamically scales each tenant's computing resources, rather than provisioning a constant amount of computing resources. This method does use servers, but a tenant need not know the details of the server network.

Sibling program is a second tenant program referenced by a first tenant program.

Simple Query Language (SQL) is a domain-specific computer language for manipulating data in a relational database management system.

Software, a.k.a. computer software or computer code or code, is data and instructions stored on the computer-readable storage medium of a computer to be executed by the processor.

Software developer, a.k.a. developer, is a person or organization that creates a computer program.

Tenant is a software developer whose program is running on a computer controlled by another party. Typically, tenants pay to rent server computing resources from cloud providers. Alternatively, a device owner may install a tenant's software on their device for the benefits of controlling and using the software, such as on a desktop, laptop, or smart phone.

Tenant program is a software program created by a tenant developer to be executed on a multitenant computer.

Uniform Resource Locator (URL), a.k.a. web address, is a reference to a web resource that specifies its location on a computer network and a mechanism for retrieving it. A typical URL could have the form http://www.example.com/index.html, which indicates a protocol (http), a hostname (www.example.com), and a file name (index.html).

Unix is a family of multitasking, multiuser computer operating systems that derive from the original AT&T Unix, whose development started in the 1970s at the Bell Labs research center by Ken Thompson and Dennis Ritchie.

User is a distinct entity initiating an execution on a computer. Typically, a user is a human interacting with an input device. Alternatively, a user is a second computer programmed to interact with the former computer.

Validator is data identifying a user, typically a session token comprising a long pseudorandom string.

Web browser, a.k.a. browser or internet browser, is a program for browsing the World Wide Web. A typically browser function is to download and render a webpage comprising HTML, JavaScript, and/or CSS. Example web browsers include Microsoft Internet Explorer, Microsoft Edge, Google Chrome, Apple Safari, and Mozilla Firefox.

Web host is a special case cloud provider specializing in serving documents on the World Wide Web.

Web page, a.k.a. webpage, is an HTML document on the World Wide Web.

Web site, a.k.a. website, is a group of related web pages controlled by one party.

Word processor is a program for humans to compose human-readable documents.

World Wide Web (WWW), a.k.a. Web, is an information network of hyperlinked documents transmitted from web servers to client web browsers over the Internet using the HTTP protocol invented by Sir Timothy Berners-Lee in 1989 at CERN. Transmitted documents typically comprise HTML, CSS, and JavaScript.

ADDITIONAL DESCRIPTION OF THE INVENTION

One aspect of the present invention comprises a "host" program on a server executing multiple "tenant" programs created by multiple developers. The host and tenant programs are preferably coded in the same programming language. Preferably, the host program offers functions, variables, libraries, and other framework tools that will be utilized by the tenant programs. Preferably, the host and tenant programs are designed to work together in a single framework.

Upon receiving input, the host program is executed and selects one or more tenant program to execute based on the input. For example, a user sends an HTTP request to a server; the server executes a host program; the host program selects a tenant program based on the HTTP request Host header; the host program returns the tenant programs output.

The host program does not use an intermediary, such as the operating system, to execute the tenant program. Preferably, the host program directly executes the tenant program in code in runtime. In a language such as PHP, this is accomplished using commands such as require and include, where the host program contains a command such as require "tenant-001.php";. Avoiding intermediation to directly execute the tenant program uses less computing resources.

Preferably, each tenant program is a single file. This allows the provider or developer to simply install one file on the server. Optionally, installation comprises uploading a file to a server where it is stored in a specific location in the file directory. Optionally, a tenant program comprises multiple files. The present disclosure sometimes describes a developer uploading, or installing, or otherwise directly transmitting the tenant program to a cloud computer. Alternatively, the developer indirectly transmits the tenant program to the provider who then directly transmits the tenant program to one or more cloud computers. In one embodiment, the developer sends the tenant program to a receiving computer controlled by the provider which then executes a program that transmits the tenant program to a network of computers. The provider optionally transmits the tenant program to a computer upon a triggering event such as a user request.

In some embodiments, the tenant program is installed on the server without review (or with limited review) by the provider. This poses a security challenge as unreviewed programs may contain harmful code.

Optionally, the operating system limits the host program's (and thus all tenant programs') abilities on the server. For example, the host program optionally runs as a "nobody" user with on a Linux system without permissions to read most files or directories. In another example, a firewall optionally blocks the host program from making/receiving certain network requests.

Optionally, the compiler (or interpreter) limits the abilities of the combined host-tenant program code. Optionally, the compiler has been modified to remove (or alter) specific commands that may pose a security risk-such as commands accessing the filesystem or commands accessing the network. Optionally, the program is encoded in a programming language designed for such restricted compiling.

Optionally, the tenant program is created by a code generator, such that the provider trusts the generator to not form malicious code. Optionally, the same party controls (fully or partially) the server and the code generator. Optionally, the code generator is controlled by a trusted third party that delivers the code directly to the provider such that the developer cannot alter it. Optionally, the code generator delivers the tenant program to the developer, who delivers the tenant program to the provider, who may then verify that the code was not altered by a pre-determined method with the code generator—for example a digital signature, a cryptographic hash, and/or a secure API request. Optionally, the code generator and host program are executed on the same server. Optionally, the code generator is interfaced with the host program. Optionally, the code generator is a Hyperpiler as described in U.S. Pat. Nos. 10,853,062, 10,942,709, and continuation filings, each of which is hereby incorporated by reference in its entirety.

Optionally, user data manipulated by a tenant program is stored in a database, network file system (NFS), or similar storage system that requires authorization credentials. Preferably, these credentials are only available to certain tenant programs in certain ways prescribed by the host program. Optionally, each tenant program may have access to only certain rows in a database table (or equivalent in a non-relational database). Optionally, access to rows in a database is automatically limited by the host program. Optionally, row access is limited cryptographically. Alternatively, row access is limited by a cell value linked with the tenant program.

Optionally, one server hosts multiple host programs in a "multihost" configuration. Optionally, each host program is isolated from other host programs by conventional methods such as user permissions and/or containerization. Optionally, each host program is encoded in a different programming language and executes tenant programs of its own language.

Optionally, tenant programs communicate with each other. Optionally, tenant programs cross-interface through APIs. Optionally, interfacing is facilitated by having one tenant program execute another tenant program at run time, using commands such as PHP's require. Optionally, interfacing is facilitated by the host program. In one embodiment, multiple functions in multiple tenant programs are individually executable other tenant programs; for example, one tenant program containing a function that modifies an employee's healthcare benefits in one database table also executes another function in another tenant program that updates budget projections. Optionally, developers are provided methods to decide which functions may be called by other tenant programs. Optionally, the user is provided a mechanism for selecting which programs may interface with each other about some given data.

This interfacing between tenant programs creates a network of interfaced programs that the user may select from to form a customized cloud software package without the conventional burden of manual or semi-manual interfacing. In one embodiment, the present invention offers business users a Customer Relationship Management (CRM) cloud platform from which they can easily interface any of a multitude of third-party programs. For example, the provider offers its own tenant program with built in CRUD functions for a customers database table. A third-party developer may offer a tenant program that sends periodic emails to customers meeting certain criteria in the customers database. The email tenant program interfaces with the customers tenant program automatically, as described in the present invention, to access customers emails without burdening the user with double data entry or complicated third party API interfacings.

Optionally, the cloud provider comprises multiple parties, such as a group of datacenter operators. Optionally, the cloud provider is a decentralized network, such as BitTorrent, Ethereum, or a peer-to-peer network. Optionally, the cloud provider is a decentralized network using a blockchain to exchange tenant programs, facilitate client-server selection, publish tenant program output, and/or track server usage. Optionally, the tenant program is a blockchain smart contract.

In one embodiment, tenant programs cross communicate in a such a manner that the processed data cannot leave the server except in certain prescribed methods. This allows a user to safely pass their data through an untrusted developer's code without risk of data breech, thus allowing third party developers to interface add-on programs to a user's program of choice and allowing the user to ad-hoc choose which programs to pass their data through.

Optionally, the host program authenticates the user. The host program accesses user data, passes the data to the tenant program, the tenant program processes the data and passes it back to the host program, the host program then stores and/or outputs the data as appropriate. In this embodiment, the tenant program is never given user credentials, allowing for less security risk.

Optionally, the host program executes certain code not included in the tenant program in the name of the tenant program. For example, a host program receives an HTTP API login request with a username and password directed towards a tenant program. The host program processes this login request itself (or through its own tenant program) and provides user credentials to the user for the tenant program. This saves the tenant program developer from the burden of having to design their own login system, plus allows a uniform login system across all tenant programs, plus provides increased user security by preventing one malicious tenant program from compromising their password.

Optionally, the host program is a script executed by a web server program (such as Apache HTTPD server or Node.js) which itself is executed by an operating system (such as Linux or Microsoft Windows). Alternatively, the host program is a web server program that has been built for the present invention. Alternatively, the host program is a web server program that has been configured for the present invention. Alternatively, the host program is interfaced into the operating system itself. Alternatively, the host program is a container executor and the tenant program is a container.

The present disclosure contains examples using the PHP programming language. Those skilled in the art will recognize the present invention may be embodied in any programming language.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A multi-tenant cloud server computer device to execute tenant programs from multiple tenant developers on the multi-tenant cloud server computer device, the multi-tenant cloud server computer device comprising at least one non-transitory computer-readable storage medium storing instructions causing at least one computer processor to:
   receive an input from a user over a computer network requesting a first tenant program of a plurality of tenant programs on the multi-tenant cloud server computer device;
   process the first tenant program according to the user input, the first tenant program having been generated by a first tenant developer using a code generation program that receives a specification without human code typing;
   determine, from the user input and the processing of the first tenant program, that additional functionality is required;
   retrieve, at run time, from a remote computer device over a computer network, according to at least one identifier contained in the first tenant program, a second tenant program generated by a second tenant developer using the code generation program without compilation of handwritten code;
   verify, after retrieval and prior to execution, an integrity-check token for the second tenant program, the integrity-check token being associated with the at least one identifier contained in the first tenant program;
   determine, from the user input and the processing of the second tenant program, that additional functionality is required;
   retrieve, at run time, from the remote computer device over a computer network, according to at least one identifier contained in the second tenant program, a third tenant program generated by a third tenant developer using the code generation program without human code typing;
   verify, after retrieval and prior to execution, an integrity-check token for the third tenant program, the integrity-check token being associated with the at least one identifier contained in the second tenant program;
   link the second tenant program and dynamically invoke routines of the third tenant program within the same process memory space;
   execute the second tenant program and third tenant program according to the user input; and
   return an output to the user over a computer network.

2. A multi-tenant cloud server computer device to execute tenant programs from multiple developers on the multi-tenant cloud server computer device, the multi-tenant cloud server computer device comprising at least one non-transitory computer-readable storage medium storing instructions causing at least one computer processor to:
   receive at least one unique credential from a user over a computer network requesting a first tenant program of a plurality of tenant programs on the multi-tenant cloud server computer device;
   validate the credential by executing the first tenant program, the first tenant program having been generated by a first tenant developer using a code generation program that receives a specification and accordingly arranges programming commands into an executable program;
   output at least one authenticator to the user;
   receive the authenticator from the user over a computer network;
   execute the first tenant program to validate the authenticator and retrieve associated user data;
   execute a second tenant program, the second tenant program having been generated by a second tenant developer using a code generation program without human code typing;
   link the second tenant program to the first tenant program and call the first tenant program's routines directly in the same process memory; and
   return an output to the user over a computer network.

3. The multi-tenant cloud server computer device of claim 2, wherein the first tenant developer is associated with a cloud hosting provider and wherein the second tenant developer is a customer of the cloud hosting provider.

4. A multi-tenant cloud server computer device to execute tenant programs from multiple developers on the multi-tenant cloud server computer device, the multi-tenant cloud server computer device comprising at least one non-transitory computer-readable storage medium storing instructions for at least one computer processor to:
   analyze a first tenant program specification authored by a first tenant developer utilizing a code generator program, the first tenant program part of a plurality of tenant programs on the multi-tenant cloud server computer device;
   determine that the first tenant program specification requires a second tenant program specification;

analyze, utilizing the code generator program, a plurality of possible second tenant program specifications for compatibility with the first tenant program specification;
select a compatible second tenant program specification authored by a second tenant developer from the plurality of possible second tenant program specifications;
generate, utilizing the code generator program, a computer program from the combination of the first tenant program specification and the second tenant program specification without human code typing; and
execute the generated computer program.

* * * * *